United States Patent [19]
Nishiyama et al.

[11] Patent Number: 5,752,986
[45] Date of Patent: May 19, 1998

[54] METHOD OF MANUFACTURING A SOLID ELECTROLYTIC CAPACITOR

[75] Inventors: Toshihiko Nishiyama; Masashi Ohi; Satoshi Arai; Koji Sakata; Atsuhiko Fujita, all of Tokyo, Japan

[73] Assignee: NEC Corporation, Tokyo, Japan

[21] Appl. No.: 334,222

[22] Filed: Nov. 4, 1994

[30] Foreign Application Priority Data

Nov. 18, 1993 [JP] Japan ..................... 5-288932

[51] Int. Cl.$^6$ ........................................ H01G 9/15
[52] U.S. Cl. ....................................... 29/25.03
[58] Field of Search ................ 29/25.03; 361/523, 361/531

[56] References Cited

U.S. PATENT DOCUMENTS

| | | | |
|---|---|---|---|
| 4,203,194 | 5/1980 | McGrath | 29/25.03 |
| 4,401,877 | 8/1983 | Webber. | |
| 5,454,147 | 10/1995 | Kobayashi et al. | 29/25.03 |

FOREIGN PATENT DOCUMENTS

| | | |
|---|---|---|
| 0 372 519 | 6/1990 | European Pat. Off. . |
| 1-105523 | 4/1989 | Japan . |
| 1-41244 | 9/1989 | Japan . |
| 1-44008 | 9/1989 | Japan . |
| 3-096210 | 4/1991 | Japan . |
| 3-78222 | 4/1991 | Japan . |
| 04219916 | 8/1992 | Japan . |
| 04219917 | 8/1992 | Japan . |
| 04264710 | 9/1992 | Japan . |
| 04264711 | 9/1992 | Japan . |

*Primary Examiner*—John Niebling
*Assistant Examiner*—Thomas G. Bilodeau
*Attorney, Agent, or Firm*—Young & Thompson

[57] ABSTRACT

A solid electrolytic capacitor free of short circuits which may be caused by the creeping of a solid electrolyte comprising a conducting polymer, and having high volume efficiency per volume. The solid electrolytic capacitor is constructed by successively forming an oxide film, a solid electrolyte (conducting polymer) and a cathode layer on an anode body which has an anode lead planted thereon. Then heating is applied, by a heater chip, to a part of the solid electrolyte that has crept from the head of the anode body along the anode lead to convert it is insulation, so as to produce a solid electrolyte insulated portion thereby. Or, in another way, the creeping solid electrolyte can be removed by heating with a heater chip and generating a thermal decomposition reaction thereof while supplying sufficient additional oxygen.

18 Claims, 3 Drawing Sheets

FIG. 2A
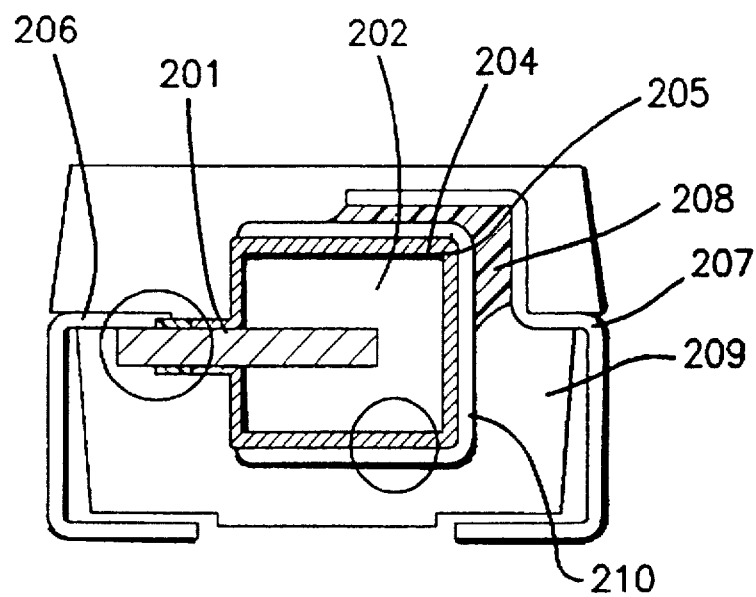
FIG. 2B
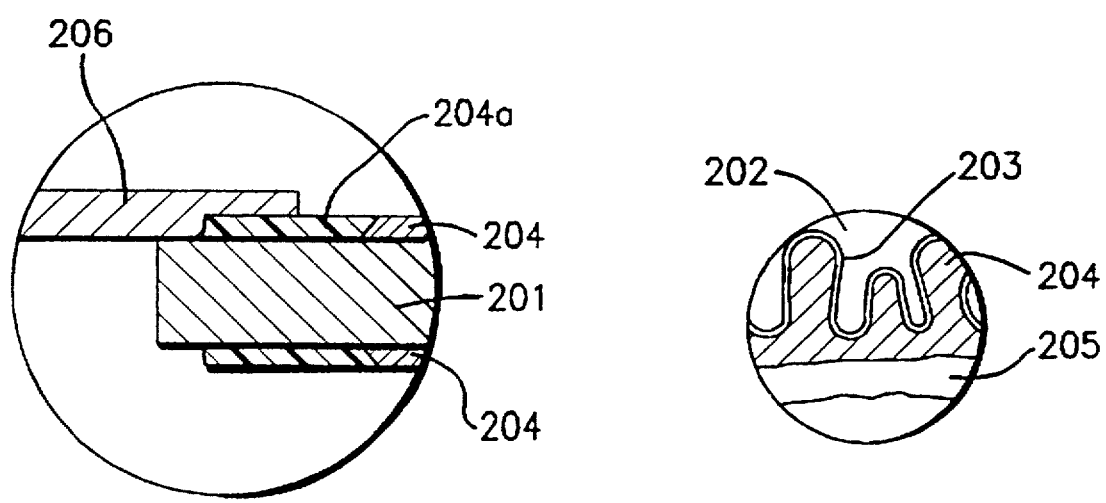
FIG. 2C

METHOD OF MANUFACTURING A SOLID ELECTROLYTIC CAPACITOR

BACKGROUND OF THE INVENTION

1. Field of the Invention

The present invention relates to a method of manufacturing solid electrolytic capacitor, in particular wherein a solid electrolytic capacitor of which the structure of a joint for joining an anode lead and an anode lead terminal is improved when conducting polymers are used as a solid electrolyte, and a method of manufacturing the same for realizing the structure of the joint improved as above.

2. Description of the Related Art

As a method of manufacturing a solid electrolytic capacitor, there is a method disclosed in Japanese Patent Publication Gazette 41244/89 or 44008/89. By this method, the solid electrolytic capacitor is manufactured as described below.

As shown in FIG. 1, in order to prevent a short circuit between an anode and a cathode caused by a creeping solid electrolyte 104, namely, to prevent contact between the solid electrolyte 104 and an anode lead terminal 106, water-repellent insulation 112 is first applied or set onto a head of an anode body 102 which has an anode lead 101 implanted therein. Then, an oxide film (not shown), the solid electrolyte 104 and a cathode layer 105 are formed successively on the anode body 102 to form a capacitor element 110.

Subsequently, the anode lead 101 and the anode lead terminal 106 are joined by welding, and the cathode layer 105 and a cathode lead terminal 107 are joined by means of a conductive adhesive 108. Thereafter, the capacitor element 110 is armored with resin 109 by a transfer molding method, except for a part of the anode lead terminal 106 and the cathode lead terminal 107. Further, a portion of the anode lead terminal 106 and the cathode lead terminal 107 exposed out of the resin 109 are bent along the resin 109, respectively, to form a chip type solid electrolytic capacitor.

In Japanese Patent Laid-open Gazette 105523/89 or Japanese Patent Publication Gazette 78222/91, it is disclosed that a conducting polymer such as polypyrrole, polythiophene, or polyaniline is employed as the above solid electrolyte 104, and that the solid electrolyte (conducting polymer) 104 is produced by the chemical polymerization of one of these conducting polymers after the insulation 112, which is an insulative heat-conducting polymer film or heat-resistant insulation is formed on the head of the anode body 102, after which the solid electrolytic capacitor is produced by means of the same steps as above.

However, with the conventional capacitor described above, particularly with the capacitor in which conducting polymers are used as the solid electrolyte, there have been troubles as described below.

(1) When the conducting polymer is produced by chemical polymerization, an organic solvent must be used as a solvent. However, in this case, the conducting polymer thus produced has a very strong tendency to creep on the anode lead 101, and hence it is difficult to prevent the creeping of the conducting polymer by using only the insulation 112.

(2) In order to prevent a short circuit caused by the conducting polymer which has crept to the anode lead 101, it is effective to separate a junction of the anode lead 101 and anode lead terminal 106 from the anode body 102. However, in this case, the anode body 102 must be formed in a reduced size resulting in the decreased electric capacity per volume of the capacitor.

3. Summary of the Invention

The present invention has been developed to solve the above problems of the conventional technique. An object of the present invention is to provide a method for producing a solid electrolytic capacitor having a solid electrolyte consisting of a conducting polymer and manufactured such that a short circuit will hardly occur between the solid electrolyte and an anode lead terminal being caused by the conducting polymer creeping on the anode lead.

Another object of the present invention is to provide a method for producing the structure of the joint of an anode lead and an anode lead terminal for realizing a capacitor with high joint reliability as above without sacrificing electric capacity per volume of the capacitor and a method of manufacturing the capacitor which allows the realization of the structure as above.

A solid electrolytic capacitor mode by the method of the present invention is characterized in that it comprises a capacitor element having an oxide film and a solid electrolyte and a cathode layer all formed on an anode body which has an anode lead implanted therein, an anode lead terminal joined to an anode lead and a cathode lead terminal joined to a cathode layer, and a resin layer covering those substances, wherein the solid electrolyte is composed of conducting polymers such as pyrrole, thiophene, or aniline and in addition the insulated solid electrolyte is formed in the proximate area of the joint of the anode lead and the anode lead terminal.

The solid electrolytic capacitor is manufactured in a manufacturing method characterized by that the solid electrolyte creeping and formed on the anode lead is converted to an insulator by being heated to a temperature below the thermal decomposition temperature using a thermal means such as heating by a heater chip, light irradiation or a hot air blast in the presence of oxygen molecules.

Further, the solid electrolytic capacitor of the present invention is characterized in that the solid electrolyte in the proximate area of the joint of the anode lead and the anode lead terminal is removed.

The solid electrolytic capacitor is manufactured in a manufacturing method characterized by that the method removes the solid electrolyte creeping and formed on the anode lead by heating and thermal decomposition thereof by using thermal means such as heating by a heater chip, light irradiation or a hot air blast, with the solid electrolyte being heated to a temperature equal to or more than the thermal decomposition temperature in the presence of oxygen molecules.

BRIEF DESCRIPTION OF THE DRAWINGS

FIG. 2 is a sectional view of a chip type solid electrolytic capacitor according to a first embodiment of the present invention.

DETAILED DESCRIPTION OF THE PREFERRED EMBODIMENTS

Figure 1:
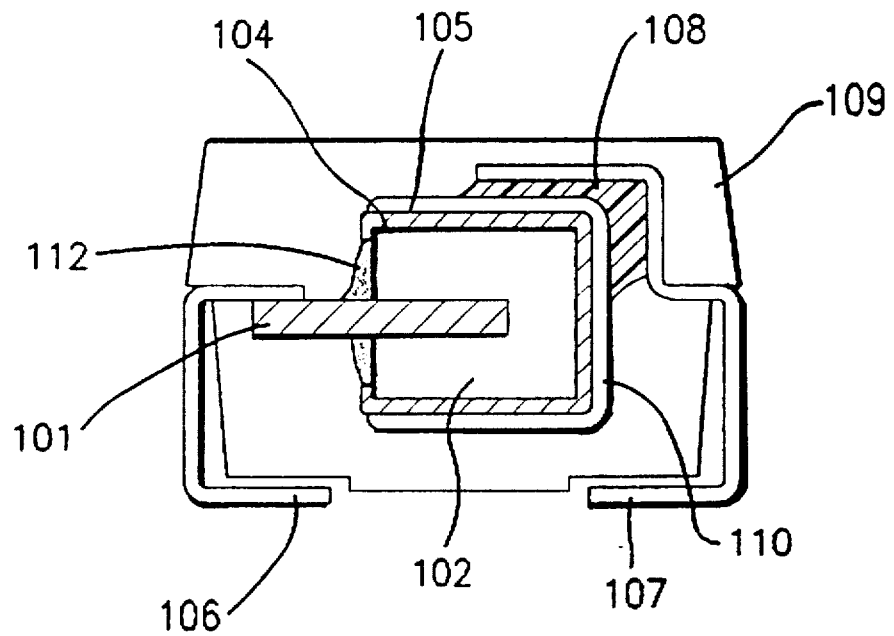
FIG. 1 is a sectional view of a conventional chip type solid electrolytic capacitor.

A preferred embodiment of the present invention will next be described with reference to the drawings. FIG. 2 is a sectional view of a chip type solid electrolytic capacitor according to a first embodiment of the present invention.

When this capacitor is manufactured, an oxide film 203 is first formed on an anode body 202 which has an anode lead 201 implanted therein by using a means well known to those skilled in the art, then polypyrrole made of conducting polymers is formed as a solid electrolyte 204. Now, polypyrrole is formed by chemical polymerization. More particularly, a pyrrole aqueous solution is first impregnated into pores of the anode body 202 to be dried, and then an organic solution of an oxidizer is additionally impregnated to be processed by polymerization. In the present embodiment, methanol was used as an organic solvent. This chemical polymerization was repeated 20 times, sufficiently forming polypyrrole in the pores. Thereafter, graphite and silver paste were impregnated and dried as a collector and an electrode, respectively, to form a cathode layer 205 thereby producing a capacitor element 210.

Subsequently, the solid electrolyte 204 that had crept along the anode lead 201 in the polymerization process of polypyrrole was partially heated and thus converted to an insulator to form an insulating portion 204a of the solid electrolyte 204. Then, the anode lead 201 and anode lead terminal 206 were joined by welding and the cathode layer 205 and cathode lead terminal 207 were joined by means of a conductive adhesive 208.

Further, after the anode lead terminal 206 and the cathode lead terminal 207 were armored, except a part thereof, with resin 209 by a transfer molding method, portions of the anode lead terminal 206 and the cathode lead terminal 207 exposed outside were bent along the armor resin 209, thereby producing a chip type solid electrolytic capacitor.

Figure 3A:
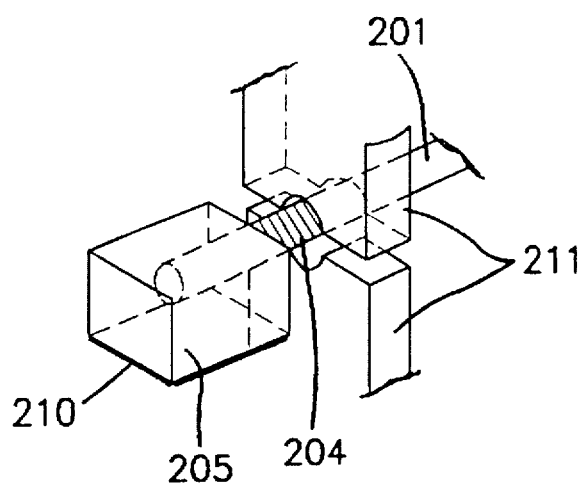
FIG. 3(a) is a perspective view showing an insulating process of the first embodiment.
Figure 3B:
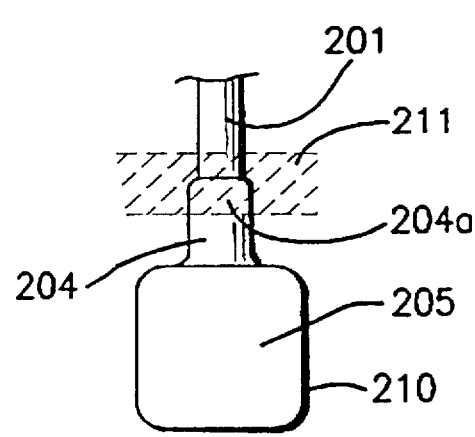
FIG. 3(b) is an external view of a capacitor element showing an insulating portion of the chip type solid electrolytic capacitor according to the first embodiment.

A means for insulating a part of the above solid electrolyte 204 will next be described with reference to FIG. 3(a), which is a perspective view showing an insulating process, and FIG. 3(b), which is an external view showing an insulating portion of a capacitor element 210.

An insulating process of the present embodiment will be described below with reference to FIG. 3(a). In the present embodiment, the solid electrolyte 204 that has crept along the anode lead 201 of the capacitor element 210 with the cathode layer 205 which had already been formed thereon was placed between a heater chip 211 consisting of upper and lower pieces. In each of the pieces of the heater chip 211, there was provided a hollow which conformed to a form of the anode lead 201. By heating this heater chip 211 at a temperature of about 270° C. for 5 to 10 seconds, the insulating portion 204a of the solid electrolyte 204 was produced.

In the present embodiment, the distance between the heater chip 211 and the anode body 202 (see FIG. 2) was studied. Since the polypyrrole thermally decomposes at about 300° C. in the presence of oxygen molecules, the temperature of the heater chip 211 was set to 270° C. and the heating time to 5 seconds. In this case, the length of the solid electrolyte 204 that crept along the anode lead 201 was 2 mm from the head of the anode body 202.

When the heater chip 211 is moved too close to the anode body 202, the solid electrolyte 204 formed even on the anode body 202 is converted to an insulator by the radiation heat of the heater chip 211, and hence the control conditions (temperature, time) of the heater chip 211 is an important factor. With the conditions of the present embodiment, it was found that there was no problem even when the distance between the heater chip 211 and the anode body 202 was lessened to about 0.5 mm.

Therefore, when compared with the solid electrolytic capacitor which was not converted to insulation according to the method of the present invention, the bias current error of the solid electrolytic capacitor of the present invention was decreased to ⅕ or less. Consequently, it became possible to elongate the anode body 202 in the direction of the anode lead 201, thereby improving the volume efficiency of the electric capacity. For example, according to the present invention, with a chip type solid electrolytic capacitor with length×width×height of 3.2×1.6×1.6 mm, respectively, the length of the anode body 2 was elongated from 0.8 mm to 1.2 mm, thereby improving its efficiency by more than 50%.

The present embodiment has been described with reference to the process for insulating the solid electrolyte by using a heater chip as a heating means, however, the same insulating effect was obtained by heating through laser irradiation or a hot air blast.

In the first embodiment described above, a short circuit between the anode lead terminal and the solid electrolyte was prevented by insulating the conducting polymer (solid electrolyte) that had crept along the anode lead. However, as shown in a second embodiment described below, it is also possible to prevent the short circuit as above by removing the crawled up portion of the conducting polymer that has crept.

Figure 4A:
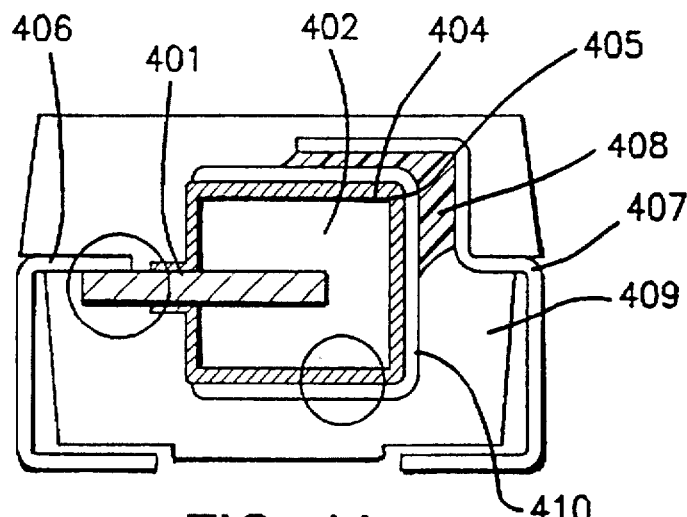
FIG. 4(a) is a sectional view showing a chip type solid electrolytic capacitor according to a second embodiment of the present invention.

FIG. 4(a) is a sectional view showing a structure of the second embodiment of the present invention. Now, the second embodiment of the present invention will be described with reference to FIG. 4(a).

In the present embodiment, with reference to a capacitor element 410 produced by the same method as the first embodiment, partial heating was applied to a solid electrolyte 404 to thermally decompose and remove the solid electrolyte which had crept along and formed on an anode lead 401 in a polypyrrole polymerization process (removed part is shown by solid electrolyte removed portion 404b in FIG. 4(a)). Thereafter, a chip type tantalum solid electrolytic capacitor was obtained through the same process as the first embodiment. Other parts such as an anode body 402, an oxide film 403, a cathode layer 405, an anode lead 406, a cathode lead terminal 407, a conductive adhesive 408 and resin 409 are similar to the anode body 102, oxide film 103, cathode layer 105, anode lead 106, cathode lead terminal 107, conductive adhesive 108 and resin 109 shown in FIG. 1, respectively.

Figure 4B:
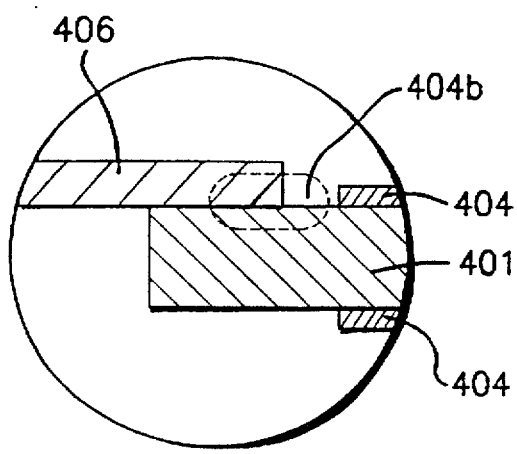
FIG. 4(b) is a perspective view showing a solid electrolyte removing process according to the second embodiment.
Figure 4C:
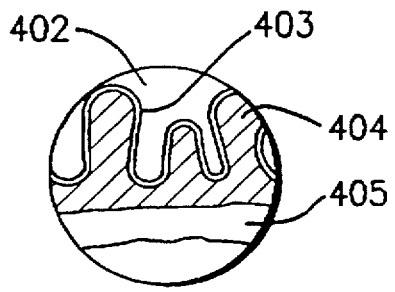
Figure 4D:
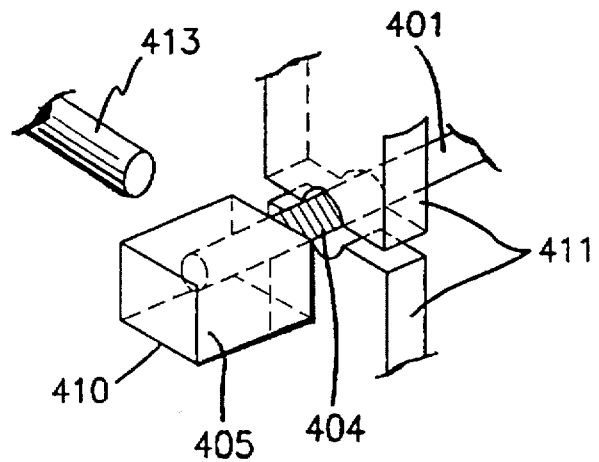

A method of removing the above solid electrolyte 404 will be described below with reference to FIG. 4(b). FIG. 4(b) is a perspective view showing a solid electrolyte removing process. An insulating process of the present embodiment will be described with reference to FIG. 4(b). In the present embodiment, the solid electrolyte 404 that has crept along the anode lead 401 of a capacitor element 410 on which the cathode layer 405 had already been formed was placed between a heater chip 411 composed of two pieces, an upper and a lower, and then the heater chip 411 was heated while being subjected to an oxygen gas stream blown from a side nozzle 413. The form of the heater chip 411 was the same as that of the first embodiment. Since the thermal decomposition temperature of polypyrrole in the presence of oxygen molecules is about 300° C., the heating temperature of the chip 411 was set to 320° C. The heating time was 2 to 5 seconds. The thermal decomposition reaction from the heat of the chip in the oxygen gas streams caused the gasification of the solid electrolyte and it was replaced by a product gas produced by the thermal decomposition reaction with oxygen molecules, and the movement of the product gas which took place, removed part of the solid electrolyte that had crept along the anode lead 1. The removed portion of the solid electrolyte is shown by a solid electrolyte removed portion 404b in FIG. 4(a).

As described above, oxygen must be supplied from the atmosphere for removing the solid electrolyte by thermal decomposition reaction. Therefore, in the present embodiment, researches and examinations of the atmosphere around the heater chip were made to provide a structure in which, as shown in FIG. 4(b), an oxygen gas stream of 5 to 50 dm³/s was blown from a nozzle 413 disposed on the side of the heater chip 411 so that the thermal decomposition of the conducting polymer might sufficiently take place due to the heat and oxygen molecules supplied thereto.

Accordingly, with the structure of the solid electrolytic capacitor described above, it was possible to reduce the leak current of the capacitor to ¹/₁₀ compared with the case in which the creeping conducting polymer was not removed and to improve the volume efficiency of the electric capacity to the same level as the first embodiment.

Further, it was also possible to heat the heater chip in the same way as the first embodiment by using laser irradiation or a hot air blast. However as the oxygen gas stream supplied from a nozzle was applied from the viewpoint of high supply efficiency of oxygen molecules, which are required for thermal decomposition, that is, from the viewpoint that the oxygen gas stream had to be able to move the thermal decomposition product gas rapidly and at the same time the oxygen density in the supply gas had to be high, it was also possible to gain the same effect as the present embodiment by using an air stream when the conditions of the air were appropriately selected. Furthermore, with reference to the direction of a gas stream to be blown, it was confirmed that the gas might be blown not only from the side direction of the heater chip but also from the upper and lower directions of the chip or from the direction along the anode lead, i.e., the direction parallel to the anode lead.

As described above, by converting to thermal insulation or removing by thermal decomposition the portion of the solid electrolyte that has crept along the anode lead which is liable to be formed particularly when conducting polymers are used as a solid electrolyte, the present invention is effective as follows.

(1) it can reduce leak current errors caused by a short circuit between the joint of an anode-lead/anode-lead-terminal and a solid electrolyte.

(2) it can permit elongating an anode body in the direction of an anode lead thereby increasing the electric capacity per volume of a capacitor.

What is claimed is:

1. A method of manufacturing a solid electrolytic capacitor comprising:

successively forming an oxide film, a conductive solid electrolyte and a cathode layer on an anode body which has an anode lead implanted therein;

joining said anode lead and an anode lead terminal;

joining said cathode layer and a cathode lead terminal;

armoring said solid electrolytic capacitor while leaving exposed a part of said anode lead terminal and said cathode lead terminal; and converting to an insulator the part of said solid electrolyte that has crept along said anode lead and contacts said anode lead terminal.

2. The method of manufacturing a solid electrolytic capacitor according to claim 1, wherein the anode lead and the anode lead terminal are joined by welding, the cathode layer and the cathode lead terminal are joined by using a conductive material, and the armoring is performed with resin.

3. The method of manufacturing a solid electrolytic capacitor according to claim 1, wherein said solid electrolyte is converted to an insulator by being heated to a temperature lower than the decomposition temperature using heating means in the presence of oxygen molecules.

4. The method of manufacturing a solid electrolytic capacitor according to claim 3, wherein said heating means is a heater chip.

5. The method of manufacturing a solid electrolytic capacitor according to claim 3, wherein said heating means is light irradiation means.

6. The method of manufacturing a solid electrolytic capacitor according to claim 3, wherein said heating means is means to generate a hot air blast.

7. A method of manufacturing a solid electrolytic capacitor comprising:

successively forming an oxide film, a conductive solid electrolyte and a cathode layer on an anode body which has an anode lead implanted therein;

joining said anode lead and an anode lead terminal;

joining said cathode layer and a cathode lead terminal;

armoring said solid electrolytic capacitor while leaving exposed a part of said anode lead terminal and said cathode lead terminal; and removing the portion of the solid electrolyte that has crept along said anode lead and contacts said anode lead terminal, wherein the removing step comprises heating in the presence of oxygen molecules supplied.

8. A method of manufacturing a solid electrolytic capacitor according to claim 7, wherein said solid electrolyte is removed by being heated to a temperature above a thermal decomposition temperature using a heating means in the presence of oxygen molecules.

9. A method of manufacturing a solid electrolytic capacitor according to claim 8, wherein said heating means is a heater chip.

10. A method of manufacturing a solid electrolytic capacitor according to claim 8, wherein said heating means is a light irradiation means.

11. A method of manufacturing a solid electrolytic capacitor according to claim 8, wherein said heating means is a means to generate a hot air blast.

12. The method of manufacturing a solid electrolytic capacitor according to claim 7, wherein the anode lead and the anode lead terminal are joined by welding, the cathode layer and the cathode lead terminal are joined by using a conductive material, and the armoring is performed with resin.

13. A method as claimed in claim 1, wherein said solid electrolyte is polypyrrole.

14. The method as claimed in claim 1, wherein said solid electrolyte is polythiophene.

15. The method as claimed in claim 1, wherein said solid electrolyte is polyaniline.

16. The method of manufacturing a solid electrolytic capacitor according to claim 7, wherein said solid electrolyte is polypyrrole.

17. The method of manufacturing a solid electrolytic capacitor according to claim 7, wherein said solid electrolyte is polythiophene.

18. The method of manufacturing a solid electrolytic capacitor according to claim 7, wherein said solid electrolyte is polyaniline.

* * * * *